May 14, 1940.                    A. C. REID                    2,201,012
                              CONTROL DEVICE
                           Filed Sept. 10, 1938
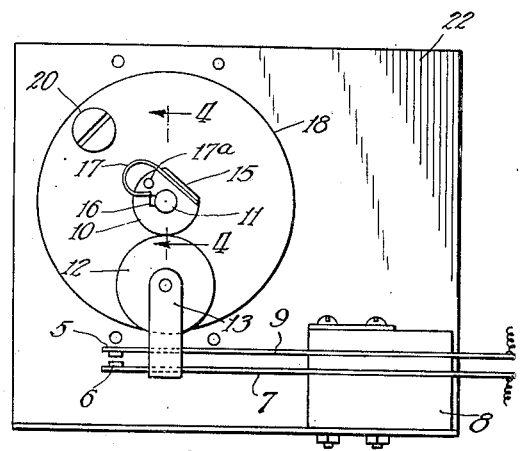
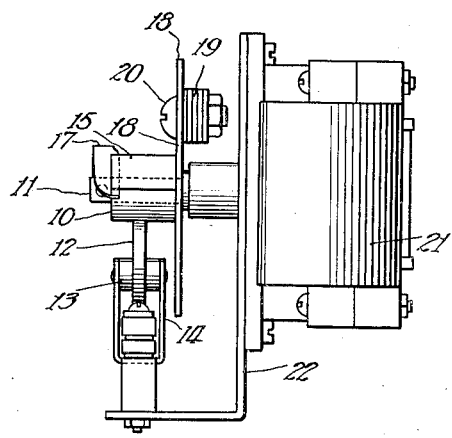
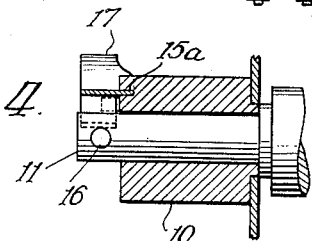
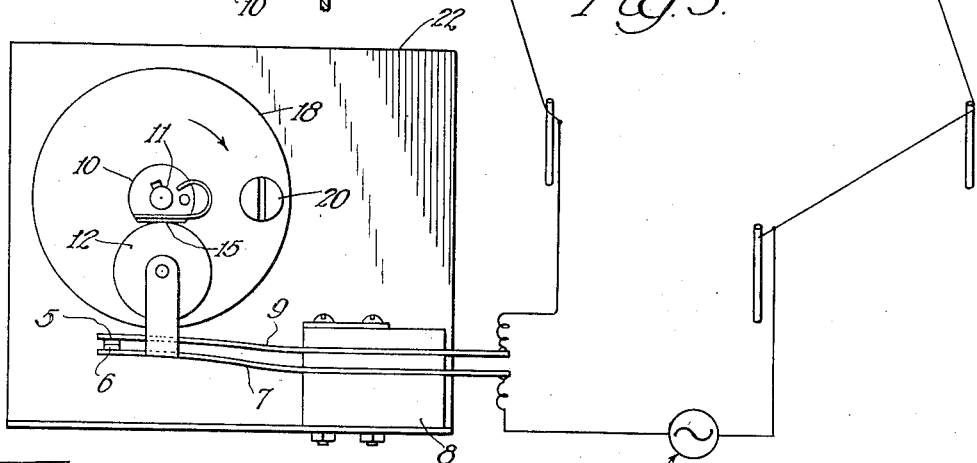
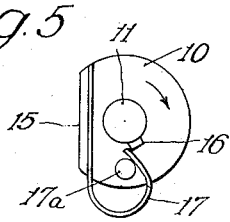
Inventor
Alexander C. Reid
By Zabel Carlson Fitzhugh & Wells Attys.

Patented May 14, 1940

2,201,012

UNITED STATES PATENT OFFICE 2,201,012

CONTROL DEVICE

Alexander C. Reid, Genoa, Ill., assignor to Leich Electric Company, Genoa, Ill., a corporation of Illinois Application September 10, 1938, Serial No. 229,262

3 Claims. (Cl. 200—30)

The present invention relates to electrical circuit control devices and is particularly concerned with that type of control device which at frequent intervals acts to close an electrical circuit for a brief period and then open it. In one form of the device it is particularly adapted to be driven by a synchronous motor and to close and open a point in an electrical circuit at intervals of about one second, for a period of say $\frac{1}{10}$ of a second. As an example of the utility of such a device, it may be applied to electrified fences wherein high frequency current is supplied to the single wire of the fence for a brief period every second.

It is the principal purpose of this invention to provide a device of this character wherein the closing and opening of the electrical circuit may be controlled so that in every instance the circuit closing unit will be left in the same position in the event that something happens to cut off the power that drives the control device. For example, in the fence control which is described, the device is so arranged that in all events the circuit closing mechanism will be left in the open position in the case of power failure.

The present invention contemplates, as a means of carrying out the purposes thereof, the provision of a rotatably mounted control element, such as a cam, which has a weight fixed thereto. A circuit controlling contact is actuated by the control element to close and open an electrical circuit during the period when the weight is traveling downward under the influence of gravity. The control element is so positioned with respect to the weight, and is so connected to the contacts in the circuit to be closed, that the contacts are closed and opened within a comparatively small portion of the travel of the weight from its highest position to its lowest position. The control element is adapted to be driven by a suitable power means, such as a synchronous motor, which is so connected to the control element as to give it the desired speed. The motor-to-control element connection is such that the control element may advance independently of the motor for a substantial portion of a revolution.

The purposes and advantages of the invention will appear more fully as the description proceeds, reference being had to the accompanying drawing wherein a preferred form of the invention is shown. It is to be understood, however, that the drawing and description are illustrative only and are not to be taken as limiting the invention except insofar as it is limited by the claims.

In the drawing,

Fig. 1 is a view in front elevation of a device embodying my invention;

Fig. 2 is a view in side elevation of the device shown in Fig. 1;

Fig. 3 is a view similar to Fig. 1 but showing a changed position of the mechanism;

Fig. 4 is an enlarged sectional view taken on the line 4—4 of Fig. 1, and

Fig. 5 is an enlarged fragmentary end view of the mechanism shown in Fig. 4.

Referring now to the drawing, the present invention is embodied in a device which is adapted to open and close a point in an electrical circuit which is controlled by two contacts 5 and 6. The electrical circuit may be of any type, such as that hereinabove referred to and shown in connection with Fig. 3 hereof, namely, a fence circuit by which a single wire fence is periodically energized. The electrical contact 6 is carried by a spring 7 mounted in a block 8 of insulating material, and the spring 7 is normally under tension urging it upwardly to bring the contact 6 into engagement with the contact 5, as shown in Fig. 3. The contact 5 is also carried by a spring arm 9 mounted in the block 8.

The control means, whereby the contacts 5 and 6 are held in open position for a period of time and then permitted to close under the force of the spring 7, comprises a cam element 10 which is rotatably mounted upon a power driven shaft 11. The cam element 10 is adapted to engage a roller 12 which is carried by the spring arm 7 of the contact 6. The spring arm 7 has two roller supporting lugs 13 and 14 which lie on opposite sides of the spring 9 of the contact 5. The cam element 10, it will be noted, has a flat surface 15 which, when it engages the roller 12, serves to actuate the contact 6 by releasing the pressure upon the roller 12 so that the spring 7 can move the contact 6 upwardly. The actuating flattened surface 15 of the cam 10 is of such length that it passes completely across the roller 12 in about 90° rotation of the cam element.

The cam element 10 is adapted to be rotated from the shaft 11 by means of a pin 16 on the shaft 11 engaging a spring 17 which is fixed on the cam element 10 at one end thereof so as to be out of the path of the roller 12. The connection between the shaft 11 and the cam element 10 by means of the pin 16 and the spring 17 is such as to provide for sufficient lost motion so that the cam element 10 can turn in the direction indicated by the arrow in Fig. 1 at least 180°, independently of the shaft 11.

In order to control the circuit in which contacts 5 and 6 are located so that if at any time the shaft 11 should fail to rotate, or the pin 16 should become broken off, the circuit would remain open, I provide means for rotating the cam 10 during its circuit actuating movement independently of the shaft 11. This means comprises a weighted crank 18, shown in the drawing as a flat disc which is affixed to the cam element 10. The crank 18 carries a weight 19 which is composed of a series of flat, heavy washers fastened to the crank 18 by a screw bolt 20. The location of the weight 19 with respect to the actuating surface 15 of the cam 10 is important. The weight 19 is located just 90° back of a radius through the center of the actuating surface 15. From Fig. 3 it will be evident that the weight 19 is exerting its greatest rotating force on the crank 18 due to gravity when the surface 15 is directly engaging the roller 12, and the contacts 5 and 6 are closed. If the shaft 11 should stop for any reason, the weight 19 is sufficient to rotate the cam element 10 until the surface 15 is out of engagement with the roller 12.

The shaft 11 may be driven by a synchronous motor 21, shown in Fig. 2, this motor being mounted upon a supporting bracket 22 which also carries the block 8 and its associated springs 7 and 9. If the motor is geared so as to turn the shaft 11 at about 60 R. P. M., the shaft 11 will raise the weight 19 to its uppermost position once for each revolution, or 60 times per minute. The weight 19 will carry the cam 10 with it during its downward movement from its uppermost position to the bottom of its orbit, and in this movement the surface 15 will engage the roller 12 to actuate the contacts 5 and 6. The speed of downward movement of the disc is substantially constant, as long as the rate at which it is rotated by the motor is not in excess of the rate at which gravity alone will cause the crank 18 to turn. I have found that with the construction as shown, the speed of rotation during the downward movement of the weight 19 is such that the contacts 5 and 6 are closed for approximately $\frac{1}{10}$ of a second.

The particular construction of the spring 17 and the pin 16 is highly advantageous in obtaining a smooth and effective driving connection between the shaft 11 and the cam 15. The cam 15 is slotted to receive the spring 17, as shown at 15a in Fig. 4. The spring 17 is curved around so that its free end is on the opposite side of a pin 17a from the part that is embedded in the cam 15. The pin 17a is a limiting stop for the free end of the spring 17. It will be evident from an inspection of Figs. 1, 3 and 5 that the pin 16 in its initial engagement with the spring 17 will be cushioned so as to prevent imparting a substantial shock to the mechanism. The effect of pressure of the pin 16 against the spring 17 is to bend the spring 17 toward the pin 17a. This bending action, however, causes a greater overlapping of the spring 17 with the pin 16, because of the peculiar shape of the spring 17, until the spring 17 engages the pin 17a. When this occurs, there is of course a positive drive connection established between the shaft 11 and the cam 15. If there is reverse rotation of the shaft 11 with respect to the cam 15, the pin 16 bends the free end of the spring outwardly and the spring rides over the end of the pin 16. It is impossible, therefore, for the pin 16 to get caught so that it would drive the cam 15 in the reverse direction.

It is believed to be evident that the mechanism will always come to rest with the contacts 5 and 6 open in the case of power failure or any other failure of the shaft 11 to continue to turn the cam element 10.

Having thus described my invention, what I claim as new and desire to secure by Letters Patent is:

1. A safety intermittent contact actuating mechanism for electrical circuits comprising a shaft, a drive motor therefor, a contact actuating element rotatably journalled on said shaft, a weighted crank connected to said element, and a lost motion drive connection between the motor shaft and said element whereby the element may be rotated by said weighted crank through a half turn independently of the shaft, said lost motion connection comprising a spring fixed to said element and having a free end portion extending toward said shaft, and a projection on said shaft adapted to engage said free end portion.

2. A safety intermittent contact actuating mechanism for electrical circuits comprising a shaft, a drive motor therefor, a contact actuating element rotatably journalled on said shaft, a weight fixed to said element, and a lost motion drive connection between the motor shaft and said element whereby the element may be rotated by said weight through a half turn independently of the shaft, said actuating element being connected to actuate the contact during said half turn, said lost motion connection comprising a pin on said shaft and a spring on said element.

3. A safety intermittent contact actuating mechanism comprising a shaft, means to rotate said shaft, a rotatable contact actuating element, a weighted crank connected to said element and operable to turn it through its contact actuating movement, said shaft being operable to complete the rotation of said element, and spring means connected with said element and operable to absorb the shock of driving connection between the shaft and the element.

ALEXANDER C. REID.